July 7, 1959
E. J. HUNTER
2,893,641
AUTOMATIC CONTROL FOR IRRIGATION SYSTEMS
Filed Oct. 11, 1954
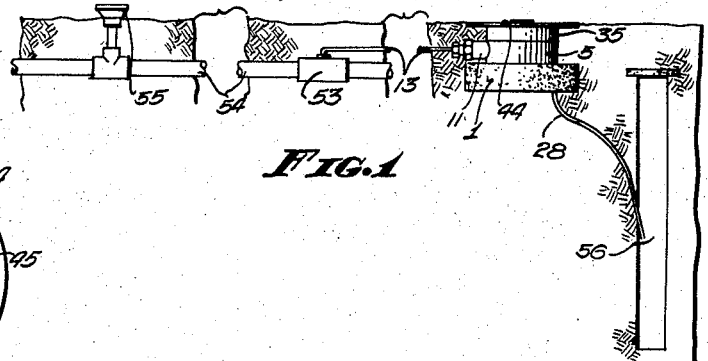
FIG.1
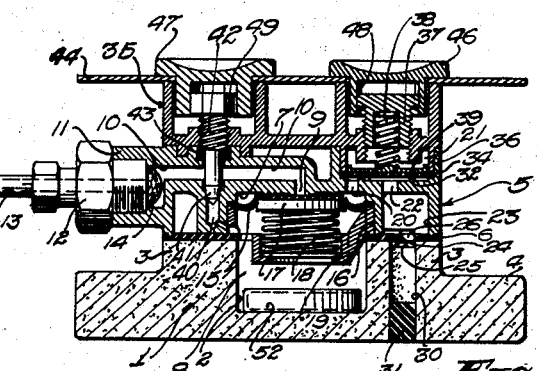
FIG.2
FIG.4
FIG.3
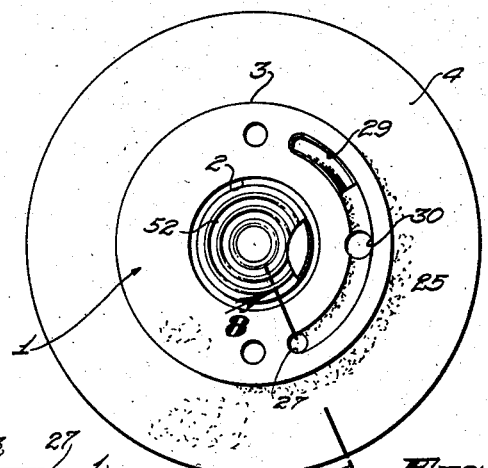
FIG.5
FIG.6
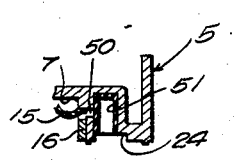
FIG.7
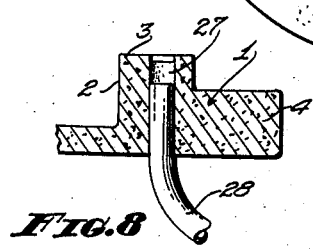
FIG.8
INVENTOR.
EDWIN J. HUNTER
BY Lloyd Spencer
ATTORNEY

2,893,641
AUTOMATIC CONTROL FOR IRRIGATION SYSTEMS

Edwin J. Hunter, Riverside, Calif.

Application October 11, 1954, Serial No. 461,336

10 Claims.   (Cl. 239—64)

My invention relates to automatic controls for irrigation systems and included in the objects of my invention are:

First, to provide an automatic control to be buried in the soil and which initiates operation of an irrigation system when the soil moisture has been depleted a predetermined amount and terminates operation after a predetermined period irrespective of whether or not the soil in the region of the automatic control has been completely rewetted.

Second, to provide an automatic control of this type which, should the irrigation cycle terminate prematurely, initiates the next cycle of irrigation earlier than would be the case if the soil were sufficiently rewetted so that the spacing between watering periods adjusts automatically to irrigation needs.

Third, to provide a means and method of automatic control of this class which, by reason of a predetermined operating period independent of the soil being rewetted in the region of the automatic control insures shut off of the irrigation cycle in the event that the sprinkler or or other irrigation means intended to cover the areas occupied by the automatic control should become clogged or wind conditions should deflect water from the area or should other conditions prevent proper rewetting of the area.

Fourth, to provide an automatic control of this class which utilizes a sealed porous cell exposed to surrounding soil and from which water is withdrawn as the soil moisture is depleted thereby to produce a vacuum pressure within the cell; and which utilizes such vacuum pressure to operate a pilot valve arranged to control the valves of an irrigation system, the automatic control incorporating a novel means and method for metering water back to said cell at a predetermined rate during operation of the irrigation system so as to relieve the vacuum pressure therein and terminate the irrigation cycle, after a preselected period should the soil not have become rewetted by irrigation.

With the above and other objects in view as may appear hereinafter, reference is directed to the accompanying drawings in which:

Figure 1 is a diagrammatical view illustrating a manner in which my automatic control may be incorporated in an irrigation system.

Figure 2 is a top or plan view of my automatic control.

Figure 3 is an enlarged sectional view thereof taken through 3—3 of Fig. 2.

Figure 4 is a top view of the bottom valve body with the back pressure valve disk shown fragmentarily.

Figure 5 is a bottom view of the bottom valve body with the diaphragm and cage shown fragmentarily.

Figure 6 is a top view of the porous cell.

Figure 7 is a fragmentary sectional view taken through 7—7 of Fig. 5 showing the means for bleeding air from the vacuum chamber.

Figure 8 is a fragmentary sectional view taken through 8—8 of Fig. 6 showing the drain tube.

My automatic control for irrigation systems employs a porous ceramic cell 1. The porous cell 1 is in the form of a disk having a central cavity 2 surrounded by a raised annular wall 3. The margins of the disk may project beyond the wall 3 to form a flange 4 which tends to hold the disk buried in soil as will be described hereinafter.

Mounted on the annular wall 3 is a disk shaped lower valve body 5. A gasket 6 is interposed between the cell 1 and the valve body 5. The under side of the lower valve body is provided with a recess 7 which registers with the cavity 2 to form therewith a vacuum chamber 8. Centered in the recess 7 is a small inlet port 9 which communicates with a radially extending inlet passage 10 terminating within a hollow boss 11 at one side of the lower valve body 5. The boss is internally screwthreaded to receive a fitting 12 which secures a small diametered control line 13 to the valve body through which water is supplied to the automatic control. A screen 14 may be provided at the entrance to the inlet passage 10.

The inlet port 9 is controlled by a diaphragm 15 secured by its margins to the side walls of the recess 7 by a clamp ring 16 press fitted therein. The diaphragm 15 forms the upper wall of the vacuum chamber 8.

The diaphragm 15 is yieldably held against the inlet port 9 by a bearing plate 17 backed by a spring 18 which is retained in a cage 19 integral with the clamp ring 16.

At one side, the upper wall of the recess 7 is provided with an outlet port 20 which communicates with a back pressure valve cavity 21 at one side thereof. The cavity 21 is open toward the upper side of the lower valve body, and is located adjacent one side margin thereof. The cavity 21 is provided with a substantially centered outlet port 22 which communicates with a downwardly opening recess 23 at one side of the recess 7 and overlying a portion of the annular wall 3 of the porous cell 1. The under side of the lower body member is provided with an arcuate channel 24 communicating with the recess 23.

The upper surface wall 3 of the porous cell 1 is provided with an arcuate channel 25 in registery with the channel 24 and communicating therewith through a hole 26 provided in the gasket 6. At one end the channel 25 is intersected by a bore 27 through the cell 1. A drain tube 28 is fitted in the bore 27 and leads from the ceramic cell.

For purposes which will be brought out hereinafter, the arcuate channel 25 forms a means whereby water may seep therefrom into the vacuum chamber 8. It is desired that the rate of seepage be preadjusted. This may be done by applying an impervious coating 29 to a selected portion of the channel. In addition to or alternatively, the channel may be intersected by one or more bores 30, the effective depths of which may be adjusted by plugs 31.

The back pressure valve cavity 21 is provided with a valve seat 32 in the form of an annular ring separating the ports 20 and 22. The valve seat 32 is provided with a small kick or notch 33 for purposes which will be brought out hereinafter. The cavity 21 receives a valve disk 34 which coacts with the valve seat 32 to form a back pressure valve.

An upper valve body 35 seats on the lower valve body 5. The upper valve body 35 is provided at one lateral side with a circular depending lip 36 which is adapted to telescope within the cavity 21 and engage the margins of the valve disk 34 to clamp and seal the valve disk in place. The upper valve body 35 is provided with a screwthreaded bore centered within the lip 36 which receives a screwthreaded stem 37 having a socket therein which receives a spring 38. The spring 38 bears against the valve disk 34 through a bearing plate 39. Adjustment of the spring 38 determines the pressure required to open the back pressure valve formed by the valve disk 34 and valve seat 32.

The inlet passage 10 is intersected by a bypass passage 40 which communicates with the vacuum or sub-atmospheric chamber 8. The bypass passage is controlled by a needle valve 41 at the lower end of a screwthreaded stem 42 which projects upwardly across the inlet passage 10 into the upper valve body 35. The valve bodies are provided with telescoping sealing flanges surrounding the stem 42 and a recess is provided for a sealing ring 43.

The upper valve body 35 is covered by a cover plate 44 which projects laterally beyond the valve body. The cover plate, valve bodies and ceramic cell are held together by a pair of screws 45 which extend downwardly through the annular wall 3 of the ceramic cell and receive nuts, not shown.

The cover plate is provided with a pair of apertures which receive respectively a back pressure valve button 46 and a manual control button 47, each radially slotted to receive a coin or screwdriver for turning. The back pressure valve button 46 is provided with a serrated socket which mates with a serrated end of the stem 37 to form an adjustable—and axially movable drive connection 48. Similarly the lower end of the control button 47 and the upper end of the stem 48 have mating polygonal or serrated cross sections to form an adjustable drive and axially movable connection 49. Thus, the back pressure adjustment of the back pressure valve and the bypass passage 40 may be readily controlled from the top of the cover plate 44.

It is desirable to completely fill the vacuum chamber with water except for a controlled air volume. To do this, it is necessary to permit air to escape from under the diaphragm 15. This is accomplished by a side port 50, shown best in Fig. 7. The side port communicates with a socket formed in the bottom valve body 5 communicating with the arcuate channel 24. Within the socket is a check valve 51 in the form of a yieldable sleeve lining the socket. Air and water can escape from the vacuum chamber 8 but water cannot back flow from the channel 24 into the vacuum chamber.

In order to have a controlled air volume within the vacuum chamber 8, there is provided a sealed hollow disk or capsule 52 having yieldable walls. This permits a corresponding migration of water into and out of the vacuum chamber.

The automatic control is buried in soil so that the ceramic cell is in moisture transfer relation to the surrounding soil. The cover plate 44 located at the surface as shown in Fig. 1. The automatic control is located within the area to be irrigated in a spot where conditions are representative of the entire area and thus the region around the automatic control receives its share of the irrigation water. Under such conditions the vacuum pressure in the vacuum chamber reflects the tension of the water in the surrounding soil; that is the vacuum or sub-atmospheric pressure increases with the depletion of moisture from the surrounding soil.

The automatic control forms, in effect, a pilot valve which is connected by the control line or bleed line 13 to a conventional booster valve or pilot valve controlled hydraulic valve 53. The booster valve is interposed in a water supply line 54 of an irrigation system which may include sprinklers 55. While one booster valve is indicated, a series of booster valves may be controlled from a single control line 13.

A booster valve suitable for use with my automatic control is shown in Figure 11 of Patent No. 2,674,490, issued April 6, 1954, to L. A. Richards. A booster valve of this type is provided with a pressure chamber which, when pressurized, closes the booster valve. Pressurizing water may be supplied from the upstream side of the booster valve or from an extraneous source. In either case, in accordance with conventional control of booster valves, it is essential that the flow of water to the pressure chamber be more constricted than the effective flow capacity through the pilot valve, or in the present case, the automatic control. That is, when the automatic control is open, either by manual operation or by suction pressure (as will be described hereinafter), the water pressure in the control line will drop sufficiently to open the booster valve.

Operation of my automatic control for irrigation systems is as follows:

When the automatic control is first installed, the manual control button 47 is turned to open the needle valve 41 so as to fill the vacuum chamber 8 with water, which escapes from the pressure chamber of the booster valve into the control line 13. The air initially within the vacuum chamber is displaced through the vent point and check valve 51. The button 47 is then turned to the "Automatic" position shown on the cover plate in Fig. 2, closing the bypass 40.

Flow from the control line 13 is prevented by the diaphragm 15 closing the inlet port 9. As the moisture in the soil around the automatic control is depleted, water from within the vacuum chamber 8 tends to flow out, due to the surface tension of the water and the small pores in the ceramic cell 1, an increasing vacuum or sub-atmospheric pressure is built up in the vacuum chamber corresponding to the water tension in the surrounding soil until the diaphragm 15 opens the inlet port 9 against the action of the spring 18.

Water then flows from the control line 13 building up a back pressure sufficient to lift the valve disk 33 from the seat 32 (but insufficient to close the booster valve) so that the water may discharge from the port 22, into the channel 24, through the hole 26, along channel 25 and out the drain tube 28. It is desired that back pressure in the channel 24 be avoided. This may be accomplished by providing a dry well 56 in the soil near the automatic control into which the tube 28 extends.

Some of the water seeps through the walls of the ceramic cell from the channel 25 and the bore 30 into the vacuum chamber 8 eventually equalizing the pressure therein (that is, raising it to atmospheric pressure) and causing the diaphragm 15 to close the inlet port 9. The time required to accomplish this is dependent upon the effective area of the channel 25 and bore 30, the porosity of the cell, and the back pressure determined by the setting of the back pressure valve.

In order that variables be limited substantially to the adjustment afforded by the back pressure valve, the porosity of the ceramic cell is determined and effective seepage areas are adjusted accordingly in the course of manufacture. Then, upon installing the automatic control, the back pressure valve is adjusted by the button 46 to approximately the desired operating period; for example from two to sixty minutes.

It will be observed that the greater the back pressure on the top of the diaphragm 15, as determined by the force of the spring 38, the nearer to atmospheric pressure must the vacuum presure in the vacuum chamber approach in order to close the inlet port 9. This increases the operating period. The operating period is further increased by the fact that the presure differential between the water in the vacuum chamber and in the channel 25 and bore 30 is less under such conditions and the flow is therefore slower. Conversely, when the back pressure on top of the diaphragm 15 is low, less water must return to the vacuum chamber, and the pressure differential inducing such return seepage is higher so that the operating period is short.

The adjustment of the operating period is determined by the nature and needs of the plants to be irrigated, and soil and drainage conditions. For example, if the plants require frequent, but short irrigation; or if run-off conditions are bad, then a short "on" or operating period is desired. The vacuum pressure will be relieved before the irrigation water replenishes the soil moisture; but the moisture depleted soil rapidly reestablishes the vacuum sub-atmospheric pressure, causing the irrigation cycle to be repeated.

The duration of the "off" period is determined by weather conditions and the consequent loss of moisture in the soil through evaporation and extraction by the plants. A location is selected for the control which is representative of the area being irrigated; that is, placement of the control to receive much or little of the irrigation water also has some effect on the duration of the off period.

The automatic control may be so adjusted that under normal conditions of operation, the operating period as determined by the time setting is in excess of the period required to return the soil moisture by irrigation. Consequently, the automatic control will operate for the period determined by the time setting only if for some reason the particular region in which the automatic control is located fails to receive its quota of irrigation of water. This might be caused by wind blowing the water elsewhere; by clogged, impaired or inoperative sprinkler heads; by plant growth blocking the water or other causes. The operating period adjustment thus affords a safety control to prevent excessive operation.

The flange 4 is not needed to fulfill the functions of the ceramic cell 1, but is employed to form an anchor to hold the automatic control in the ground.

It will be observed that with the needle valve 41 open the control line is permitted to bleed through the vacuum chamber and vent port so that the irrigation system may be manually turned on. The nick or notch 33 also allows atmospheric pressure to be maintained above the diaphragm, as the diaphragm moves down in response to a build up of vacuum pressure below the diaphragm.

Although I have shown and described a certain embodiment of my invention, I do not desire to be limited to the embodiment shown and described, but desire to include within the scope of my invention all novelty inherent in the appended claims.

I claim:

1. An automatic irrigation control device, comprising: a porous cell adapted to be placed in moisture transfer relation with soil and having a cavity adapted, when water filled, to develop a vacuum pressure corresponding to the depletion of soil moisture; a pilot valve including a vacuum operable element connected with said porous cell cavity, a water inlet and a water outlet, said inlet adapted to be connected to an irrigation valve to be controlled; a drain tube connected with the outlet of said pilot valve; and means interposed between said outlet and drain tube defining a passageway at least partially walled by said porous cell to permit seepage into said cavity of a portion of the water flowing to said drain tube.

2. An automatic irrigation control device, comprising: a porous cell adapted to be placed in moisture transfer relation with soil and having a cavity adapted, when water filled, to develop a vacuum pressure corresponding to the depletion of soil moisture; a pilot valve including a vacuum operable element connected with said porous cell cavity, a water inlet and a water outlet, said inlet adapted to be connected to an irrigation valve to be controlled; a drain tube connected with the outlet of said pilot valve; means interposed between said outlet and drain tube defining a passageway at least partially walled by said porous cell to permit seepage into said cavity of a portion of the water flowing to said drain tube; means defining a bypass from the inlet of said pilot valve to said cavity; and a manually operable valve for opening and closing said bypass.

3. An automatic irrigation control device, comprising: a porous cell adapted to be placed in moisture transfer relation with soil and having a cavity adapted, when water filled, to develop a vacuum pressure corresponding to the depletion of soil moisture; a pilot valve including a vacuum operable element connected with said porous cell cavity, a water inlet and a water outlet, said inlet adapted to be connected to an irrigation valve to be controlled; a drain tube connected with the outlet of said pilot valve; and means interposed between said outlet and drain tube defining a passageway at least partially walled by said porous cell to permit seepage into said cavity of a portion of the water flowing in said drain tube; and a manually adjustable back pressure valve interposed between said means and pilot valve outlet to regulate the operating period of said pilot valve.

4. An automatic irrigation control device, comprising: a porous cell adapted to be placed in moisture transfer relation with soil and having a cavity adapted, when water filled, to develop a vacuum pressure corresponding to the depletion of soil moisture; a pilot valve including a vacuum operable element connected with said porous cell cavity, a water inlet and a water outlet, said inlet adapted to be connected to an irrigation valve to be controlled; a drain tube connected with the outlet of said pilot valve; means interposed between said outlet and drain tube defining a passageway at least partially walled by said porous cell to permit seepage into said cavity of a portion of the water flowing in said drain tube; a manually adjustable back pressure valve interposed between said means and pilot valve outlet to regulate the operating period of said pilot valve; means defining a vent port from said cavity; a check valve in said vent port to prevent back flow therethrough; means defining a bypass from the inlet of said pilot valve to said cavity; and a manually operated valve for said bypass adapted, when open, to permit flow into said cavity and out said vent port and, when closed, to seal said bypass.

5. An automatic irrigation control device, comprising: a porous cell adapted to be placed in moisture transfer relation with soil and having a cavity adapted, when water filled, to develop a vacuum pressure corresponding to the depletion of soil moisture; a valve connected with said porous cell cavity and adapted to open when a predetermined vacuum pressure is established in the cavity of said porous cell and close when said vacuum pressure is at least partially relieved; and means including a passageway in the walls of said porous cell for conducting water from said valve and permitting seepage of a portion of the water into said cavity to relieve the vacuum pressure therein.

6. An automatic irrigation control device, comprising: a porous cell adapted to be placed in moisture transfer relation with soil and having a cavity adapted, when water filled, to develop a vacuum pressure corresponding to the depletion of soil moisture; a valve connected with said porous cell cavity and adapted to open when a predetermined vacuum pressure is established in the cavity of said porous cell and close when said vacuum pressure is at least partially relieved; means including a passageway in the walls of said porous cell for conducting water from said valve and permitting seepage of a portion of the water into said cavity to relieve the vacuum pressure therein; and a manually adjustable control for regulating the valve closing pressure required in said cavity and the rate of seepage of water into said cavity thereby to vary the open period of said valve.

7. An automatic irrigation control device, comprising: a porous cell adapted to be placed in moisture transfer relation with soil and having a cavity adapted, when water filled, to develop a vacuum pressure corresponding to the depletion of soil moisture; a vacuum responsive valve connected with said porous cell cavity and adapted to open when a predetermined vacuum pressure is established in the cavity of said porous cell and close when said vacuum pressure is at least partially relieved; means including a passageway in the walls of said porous cell for conducting water from said vacuum responsive valve and permitting seepage of a portion of the water into said cavity to relieve the vacuum pressure therein; means defining a bypass from the inlet side of said vacuum responsive valve into said cavity; a check valve controlled vent for outflow from said cavity; and a manually operable valve to open and close said bypass.

8. An automatic irrigation control device, comprising: a porous cell adapted to be placed in moisture transfer relation with soil and having a cavity adapted, when water filled, to develop a vacuum pressure corresponding to the depletion of soil moisture; a vacuum responsive valve connected with said porous cell cavity and adapted to open when a predetermined vacuum pressure is established in the cavity of said porous cell and close when said vacuum pressure is at least partially relieved; means including a passageway in the walls of said porous cell for conducting water from said vacuum responsive valve and permitting seepage of a portion of the water into said cavity to relieve the vacuum pressure therein; a manually adjustable control means for regulating the vacuum responsive valve closing pressure required in said cavity and the rate of seepage of water into said cavity thereby to vary the open period of said vacuum responsive valve; means defining a bypass from the side of said vacuum responsive valve into said cavity; a check valve controlled vent for outflow from said cavity; and a manually operable valve to open and close said bypass.

9. An automatic irrigation control device, comprising: a porous cell adapted to be placed in moisture transfer relation with soil and having a cavity adapted, when water filled, to develop a vacuum pressure corresponding to the depletion of soil moisture; a valve connected with said porous cell cavity and adapted to open when a predetermined vacuum pressure is established in the cavity of said porous cell and close when said vacuum pressure is at least partially relieved; a sealed air filled yieldable capsule in said cavity whereby a corresponding migration of water is required to create and relieve the vacuum pressure in said cavity; and means for supplying water to said cavity while said valve is open to relieve the vacuum pressure in said cavity and cause said valve to close after a predetermined interval.

10. An automatic irrigation control device, comprising: a porous cell adapted to be placed in moisture transfer relation with soil and having a cavity adapted, when water filled, to develop a vacuum pressure corresponding to the depletion of soil moisture; a valve connected with said porous cell cavity and adapted to open when a predetermined vacuum pressure is established in the cavity of said porous cell and close when said vacuum pressure is at least partially relieved; a sealed air filled yieldable capsule in said cavity whereby a corresponding migration of water is required to create and relieve the vacuum pressure in said cavity; and means for supplying water to said cavity while said valve is open to relieve the vacuum pressure in said cavity and cause said valve to close after a predetermined interval; and a manually operable means for regulating the return of water to said cavity to control the operating period of said valve.

References Cited in the file of this patent

UNITED STATES PATENTS

| 2,445,717 | Richards | July 20, 1948 |
| 2,577,337 | Lancaster | Dec. 4, 1951 |
| 2,674,490 | Richards | Apr. 6, 1954 |